US012309335B2

(12) United States Patent
Namba et al.

(10) Patent No.: US 12,309,335 B2
(45) Date of Patent: May 20, 2025

(54) READING APPARATUS WITH SENSORS LOCATED AT DIFFERENT POSITIONS ALONG A CONVEYER PATH

(71) Applicant: BROTHER KOGYO KABUSHIKI KAISHA, Nagoya (JP)

(72) Inventors: Mamoru Namba, Nagoya (JP); Tadanobu Chikamoto, Nagoya (JP); Genki Hoshino, Nagoya (JP); Hiroshi Shiomi, Nagoya (JP); Takashi Ohama, Iwakura (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 17/712,821

(22) Filed: Apr. 4, 2022

(65) Prior Publication Data

US 2022/0329708 A1 Oct. 13, 2022

(30) Foreign Application Priority Data

Apr. 9, 2021 (JP) .................................. 2021-066550

(51) Int. Cl.
*H04N 1/203* (2006.01)
*H04N 1/00* (2006.01)
(Continued)

(52) U.S. Cl.
CPC ....... *H04N 1/2032* (2013.01); *H04N 1/00594* (2013.01); *H04N 1/00636* (2013.01); *H04N 1/1065* (2013.01); *H04N 1/1215* (2013.01)

(58) Field of Classification Search
CPC ........... H04N 1/00594; H04N 1/00636; H04N 1/1065; H04N 1/1215; H04N 1/2032
(Continued)

(56) References Cited

U.S. PATENT DOCUMENTS 5,826,133 A * 10/1998 Saito ...................... H04N 1/203
358/300
2002/0036809 A1* 3/2002 Tohyama ............... H04N 1/203
358/488
(Continued)

FOREIGN PATENT DOCUMENTS

JP 2013-098716 A 5/2013
JP 2014-011684 A 1/2014
(Continued)

OTHER PUBLICATIONS

Japan Patent Office, Notice of Reasons for Refusal issued in Japanese Patent Application No. 2021-066550, dated Dec. 17, 2024 (6 pages).

*Primary Examiner* — Chad Dickerson
(74) *Attorney, Agent, or Firm* — Baker Botts L.L.P.

(57) ABSTRACT

A reading apparatus, having a document tray, an ejection tray, a conveyer path connecting the document tray and the ejection tray and having a curved section, a conveyer to convey an original document in a conveying orientation, a first reading sensor, and a second reading sensor, is provided. The first reading sensor is located upstream in the conveying orientation from the curved section in the conveyer path. The first reading sensor optically reads a first side of the original document from below. The second reading sensor is located upstream in the conveying orientation from the first reading sensor in the conveyer path. The second reading sensor optically reads a second side of the original document from above. The first side and the second side are sides of the original document that face upward and downward, respectively, in the state where an original document is placed on the document tray.

8 Claims, 11 Drawing Sheets

(51) Int. Cl.
*H04N 1/10* (2006.01)
*H04N 1/12* (2006.01)

(58) Field of Classification Search
USPC ........ 358/1.11–1.18, 1.1, 500, 501, 400–404
See application file for complete search history.

(56) References Cited

U.S. PATENT DOCUMENTS

| | | | | |
|---|---|---|---|---|
| 2007/0223062 | A1* | 9/2007 | Tanaka | H04N 1/1245 |
| | | | | 358/497 |
| 2007/0236756 | A1* | 10/2007 | Yamaguchi | H04N 1/193 |
| | | | | 358/498 |
| 2009/0324312 | A1* | 12/2009 | Kusama | B65H 29/14 |
| | | | | 399/405 |
| 2011/0096379 | A1* | 4/2011 | Kurokawa | G03G 15/605 |
| | | | | 358/498 |
| 2012/0205858 | A1* | 8/2012 | Takeshita | B41J 13/106 |
| | | | | 271/121 |
| 2013/0107334 | A1 | 5/2013 | Miura et al. | |
| 2015/0091234 | A1 | 4/2015 | Miura | |
| 2018/0205845 | A1* | 7/2018 | Wilsher | H04N 1/122 |
| 2021/0352188 | A1* | 11/2021 | Smith | B65H 1/04 |
| 2022/0078302 | A1* | 3/2022 | Lai | H04N 1/00519 |
| 2022/0329704 | A1* | 10/2022 | Namba | H04N 1/00551 |

FOREIGN PATENT DOCUMENTS

| | | | |
|---|---|---|---|
| JP | 2015-070414 A | | 4/2015 |
| JP | 2016208132 A | * | 12/2016 |

* cited by examiner

READING APPARATUS WITH SENSORS LOCATED AT DIFFERENT POSITIONS ALONG A CONVEYER PATH

CROSS REFERENCE TO RELATED APPLICATION

This application claims priority under 35 U.S.C. § 119 from Japanese Patent Application No. 2021-066550, filed on Apr. 9, 2021, the entire subject matter of which is incorporated herein by reference.

BACKGROUND

The present disclosure is related to a reading apparatus capable of reading images of an original document conveyed in a conveyer path.

A reading apparatus having two reading sensors, by which images of both a first side and a second side of an original document being conveyed may be read, is known. For example, a document reading apparatus having two reading sensors, a document tray, a sheet-ejection tray located above the document tray, and a curved conveyer path connecting the document tray and the sheet-ejection tray, is known. An original document may be conveyed from the document tray, turning upward in a form of U in the conveyer path, to the sheet-ejection tray. Along the conveyer path, an image reading device containing one of the two reading sensors may be located at a position upstream from the U-formed curved section of the conveyer path, in a conveying direction when the images of the original document are read with use of an auto-document feeder (ADF). The other one of the reading sensors may be located in a main body of the document reading apparatus at a position upstream from the image reading device in the conveying direction.

SUMMARY

In the above-mentioned document reading apparatus, the image reading device may be located between the curved section of the conveyer path and a reading position of the reading sensor. Therefore, downsizing of the document reading apparatus in a direction along the conveying direction may be difficult.

The present disclosure is advantageous in that a reading apparatus, having a first reading sensor and a second reading sensor for reading both sides of an original document, of which dimension in a direction along a conveying direction is reducible, is provided.

According to an aspect of the present disclosure, a reading apparatus, having a document tray, an ejection tray, a conveyer path, a conveyer, a first reading sensor, and a second reading sensor, is provided. The ejection tray is located above the document tray. The conveyer path connects the document tray and the ejection tray. The conveyer path has a curved section curving from a lower position toward an upper position. The conveyer is configured to convey an original document in a conveying orientation from the document tray toward the ejection tray in the conveyer path. The first reading sensor is located upstream in the conveying orientation from the curved section in the conveyer path. The first reading sensor is configured to optically read a first side of the original document from below. The first side is a side of the original document that faces downward in a state where the original document is placed on the document tray. The second reading sensor is located upstream in the conveying orientation from the first reading sensor in the conveyer path. The second reading sensor is configured to optically read a second side of the original document from below. The second side is a side of the original document that faces upward in the state where the original document is placed on the document tray.

DETAILED DESCRIPTION

In the following paragraphs, with reference to the accompanying drawings, an embodiment of the present disclosure will be described. It is noted that the MFD 1 described below is merely one embodiment of the present disclosure, and various connections may be set forth between elements in the following description. These connections in general and, unless specified otherwise, may be direct or indirect and that this specification is not intended to be limiting in this respect. In the following description, directivity indicated by a pointing arrow, from a stem toward a pointing head, will be expressed by a term "orientation," whereas back or forth movability along a line or a curve extending through a stem and pointing heads of a double-headed arrow will be expressed by a term "direction." Moreover, positional relation within the MFD 1 and each part or item included in the MFD 1 will be mentioned on basis of a posture of the MFD 1 set in an ordinarily usable condition (see FIG. 1). For example, a vertical axis between an upper side and a lower side of the MFD 1 in the ordinarily usable posture is defined as an up-down direction 7. A side of the MFD 1, on which an opening 4 is formed, is defined as a front side, and an axis between the front side and a rear side opposite from the front side is defined as a front-rear direction 8. A right-hand side and a left-hand side to a user who faces the front side of the MFD 1 are defined as a rightward side and a leftward side, respectively. An axis between the rightward side and the leftward side is defined as a right-left direction 9. The up-down direction 7, the front-rear direction 8, and the right-left direction 9 intersect orthogonally to one another. In the following description, the up-down direction 7 and the right-left direction 9 may be referred to as a vertical direction 7 and a crosswise direction 9, respectively.

[Overall Configuration of MFD 1]

Figure 1:
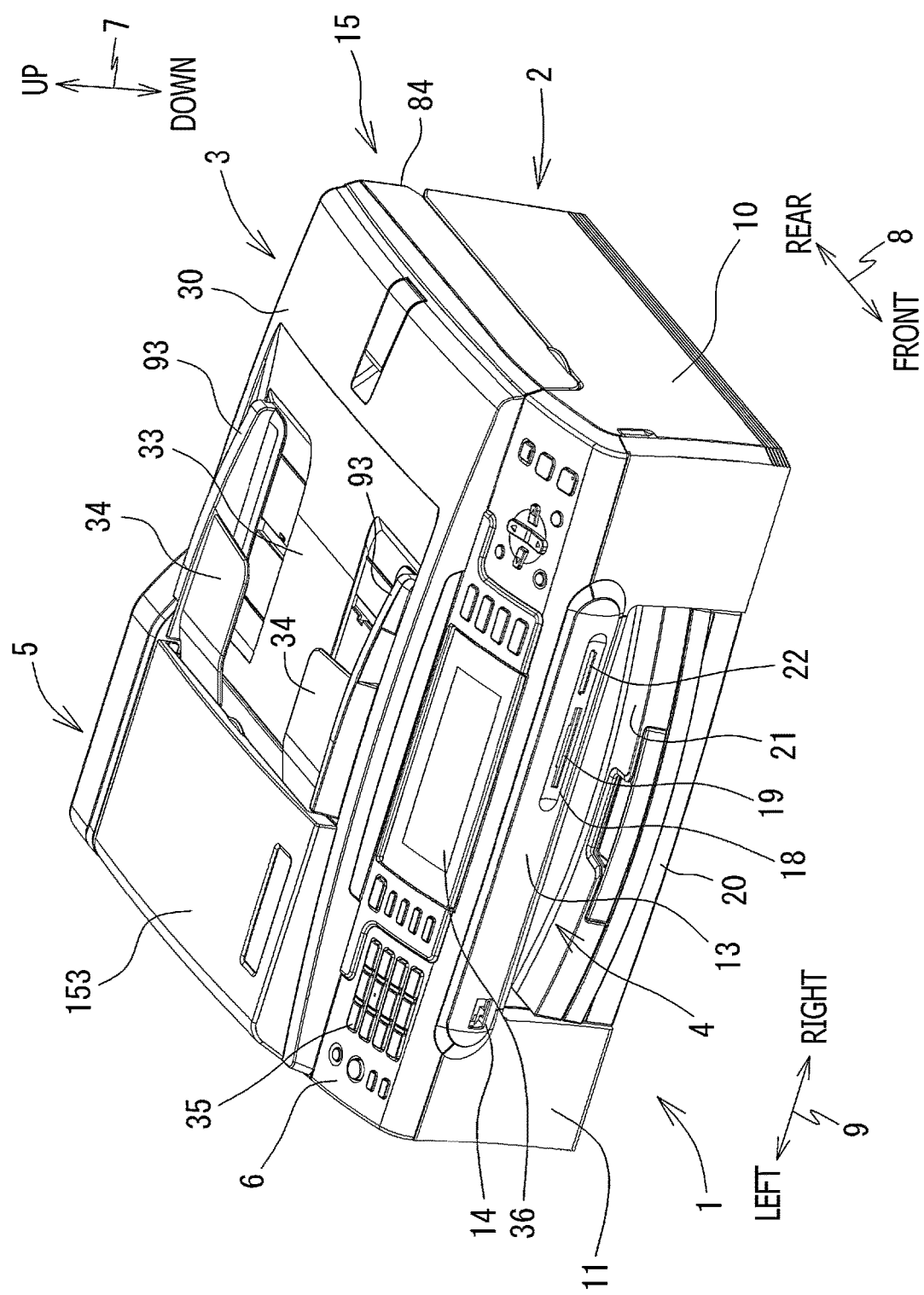
FIG. 1 is a perspective view of an exterior appearance of a multifunction peripheral device (MFD) 1 according to an embodiment of the present disclosure.

FIG. 1 is a perspective view of an exterior appearance of the MFD 1 including the ADF 5 according to the embodiment of the present disclosure.

The MFD 1 is a multifunction device having a printer 2, which may be an inkjet printer, arranged at a lower position, and a scanner 3, arranged on top of the printer 2, integrally. The MFD 1 is equipped with multiple functions including a printing function, a scanning function, a copying function, and a facsimile transmitting/receiving function. However, embodiment of the present disclosure may not necessarily require the printing function, the copying function, or the facsimile transmitting/receiving function, but the present disclosure may be embodied by the scanner 3 with the ADF 5 alone. In other words, the functions other than the scanning function are optional.

With the copying function, the MFD 1 may reproduce an image of an original document read by the scanner 3 on a recording sheet with use of the printer 2. With the facsimile transmitting/receiving function, the MFD 1 may transmit image data composing an image of the original document read by the scanner 3 externally to a facsimile machine through, for example, telecommunication lines. Moreover, the MFD 1 may receive external facsimile data and reproduce an image of the facsimile data on a recording sheet with use of the printer 2.

With the scanning function, image data composing an image of the original document 12 read by the scanner 3 may be transferred to a computer connected with the MFD 1 through wires or wirelessly. Moreover, the MFD 1 may transfer the image data composing the image of the original document 12 read by the scanner 3 to a storage medium such as a memory card or Universal Serial Bus (USB) memory and save the image data therein.

[Configuration of Scanner 3]

The scanner 3 includes, as shown in FIGS. 1-4, an ADF document tray 33, an ADF ejection tray 34, a conveyer path 151, a conveyer 16 for conveying the original document 12, a first contact image sensor (CIS) 85 being a reading sensor, and a second contact image sensor (CIS) 95 being another reading sensor.

As shown in FIG. 1, an exterior appearance of the MFD 1 is approximately in a form of a short and wide rectangular box, of which width and depth are substantially greater than height. The printer 2 forming a lower part of the MFD 1 has a housing 10, which forms a framework of the printer 2. In a front panel 11, which forms a front face of the housing 10, the opening 4 is formed. Inside the opening 4, a feeder tray 20 and an ejection tray 21 are arranged vertically in tiers. On an upper side of the opening 4, a connector panel 13, in which multiple types of connectors are provided, is arranged. In a rightward area in the connector panel 13, a slot section 18 is arranged. The slot section 18 allows multiple types of memory cards to be inserted and provides electrical connection between a controller 130 (see FIG. 5) of the MFD 1 and the memory cards. The memory cards may include card-formed storage devices, which contain flash memory as storage medium. In the slot section 18, a first card slot 19 and a second card slot 22 in different slot forms are arranged side by side to allow the memory cards in different types to be attached. Inside a rightward part of the front panel 11 in the crosswise direction 9, ink cartridges may be housed.

In an upper-frontward area of the MFD 1, an operation panel 6 for operating the printer 2 and the scanner 3 is arranged. The operation panel 6 may include various type of operation buttons 35 and a liquid crystal display (LCD) 36. The MFD 1 may operate based on commands entered through the operation panel 6. Optionally, when the MFD 1 connected with an external computer, the MFD 1 may operate based on commands from the computer entered through a printer driver or a scanner driver.

Next, with reference to FIGS. 2-4, an overall configuration of the scanner 3 will be described.

The scanner 3 has a document cover 30, which is attached movably with respect to a supporting base 15 through hinges arranged on a rear side of the scanner 3. The document cover 30 may pivot in a direction indicated by an arrow P1 in FIG. 2 to open or close the supporting base 15 serving as a flatbed scanner (FBS). In particular, the document cover 30 is movable with respect to the supporting base 15 having a platen glass 80 (see FIG. 4) between an open position and a closed position. The document cover 30 located at the closed position may cover the platen glass 80. The document cover 30 has the ADF 5 integrally; therefore, the ADF 5 may move along with opening and closing movements of the document cover 30. The ADF document tray 33, the ADF ejection tray 34, the conveyer path 151, the conveyer 16, and the second CIS 95 are arranged inside the document cover 30. On the other hand, the first CIS 85 is arranged inside the supporting base 15.

On an upper side of the supporting base 15, the platen glass 80 is arranged. When the document cover 30 is closed with respect to the supporting base 15, the platen glass 80 is covered by the document cover 30. The document cover 30 has a resilient plate 82, which may face the platen glass 80, at a lower side thereof.

When the document cover 30 is at the closed position, the resilient plate 82 may contact the platen glass 80. The resilient plate 82 may press and stabilize an original document 12 placed on top of the platen glass 80. The resilient plate 82 includes a plate member 74 and a sponge member 75. The plate member 74 is, in order to receive a substantial amount of reflective light from the original document 12, plainly in a solid color such as white. The plate member 74 is attached to the document cover 30 through the sponge member 75. The resilient plate 82 is, when the document cover 30 is at the closed position, located to form a bottom, or a lowermost part, of the document cover 30. In other words, the resilient plate 82 having the sponge member 75 is, when the document cover 30 is at the closed position, located to be lower than the second CIS 95.

The platen glass 80 is a transparent plate made of, for example, glass or acrylic resin. At a leftward position on the platen glass 80, a positioning member 83 to define a border between a readable range 80A and a readable range 80B is arranged. The readable range 80A is a range, in which an image of the original document 12 may be read with use of the ADF 5. The readable range 80B is a range, in which the image of the original document 12 may be read with use of the scanner 3 as the FBS. The positioning member 83 may serve as a positioning reference to set the original document 12 on the platen glass 80. On an upper surface of the positioning member 83, placement indications for positions to set the original documents 12 in different sizes, such as A4 and B5, on the platen glass 80 are marked. Moreover, the positioning member 83 may, when the ADF 5 is used, guide the original document 12 passing over the readable range 80A to return to the conveyer path 151 in the ADF 5.

Figure 4:
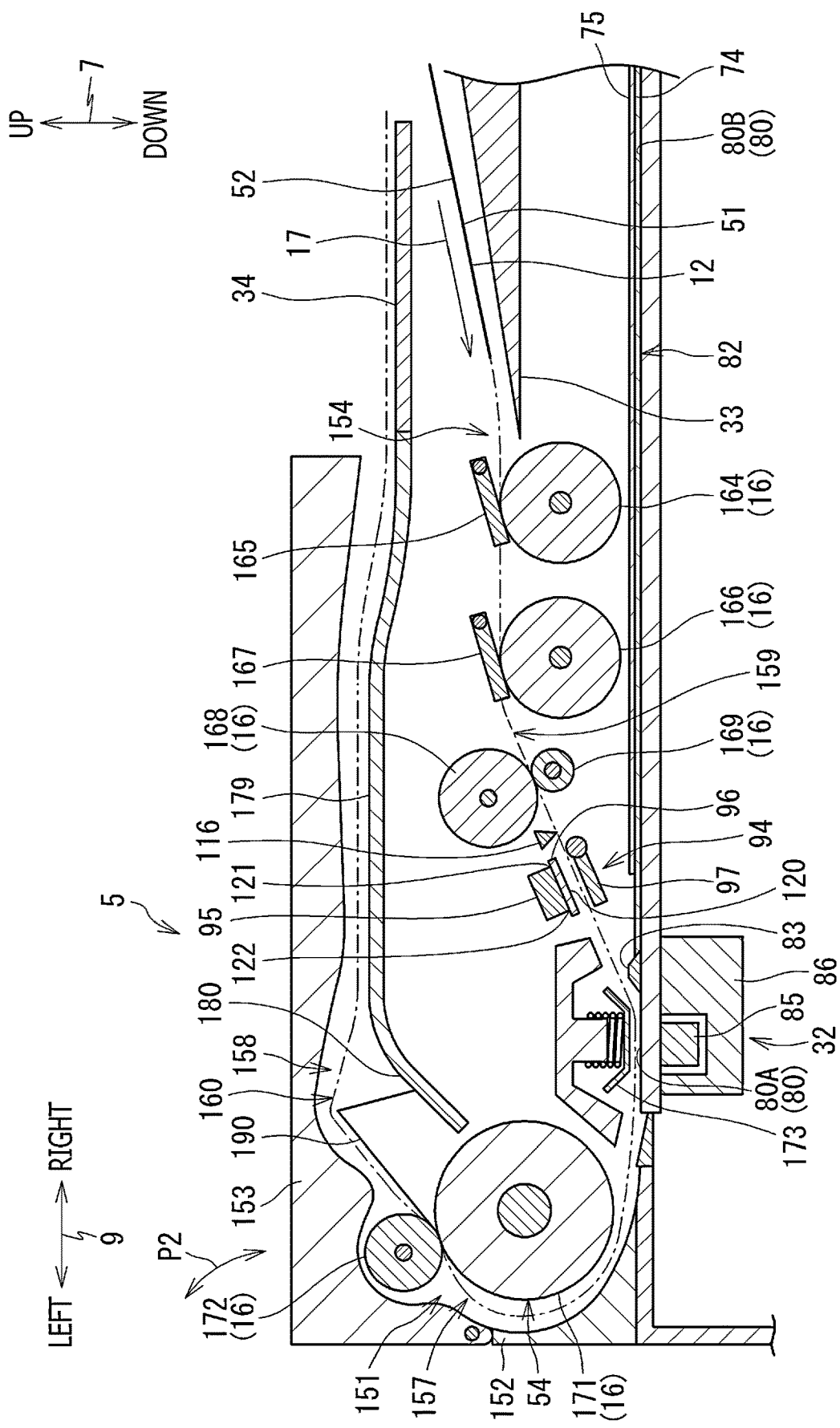
FIG. 4 is a cross-sectional view to illustrate an inner structure of an auto-document feeder (ADF) 5 according to the embodiment of the present disclosure.

As shown in FIG. 4, inside the supporting base 15, a first image reading unit 32 is installed. When the scanner 3 is to be used as the FBS, the document cover 30 may be opened, the original document 12 may be placed on the platen glass 80, and the document cover 30 may be closed. Thereby, the original document 12 may be stabilized on the platen glass 80. While the original document 12 is stabilized, the first image reading unit 32 may move in a range below the platen glass 80 and read the image of the original document 12 on the platen glass 80.

The first image reading unit 32 includes the first CIS 85 and a CIS carriage 86 having a form of an elongated rectangular bar. On an upper side of the CIS carriage 86, the first CIS 85 is mounted. In this arrangement, the first CIS 85 is located underneath the platen glass 80 and faces a downward surface of the platen glass 80. The first CIS 85 is located at an upstream position with respect to a curved section 54 of the conveyer path 151 in a conveying orientation 17. The first CIS 85 may optically read the image of the original document 12 from a lower side of the conveyer path 151. The first CIS 85 is a so-called contact-typed line image sensor, in which light sources such as LEDs may emit light at the original document 12, the light reflected on the original document 12 may be guided to photoelectric conversion elements through lenses, and the photoelectric conversion elements may output electric signals according to intensities of the reflected light to the controller 130. The first CIS 85 mounted on the CIS carriage 86 may reciprocate in the range underneath the platen glass 80.

Figure 3:
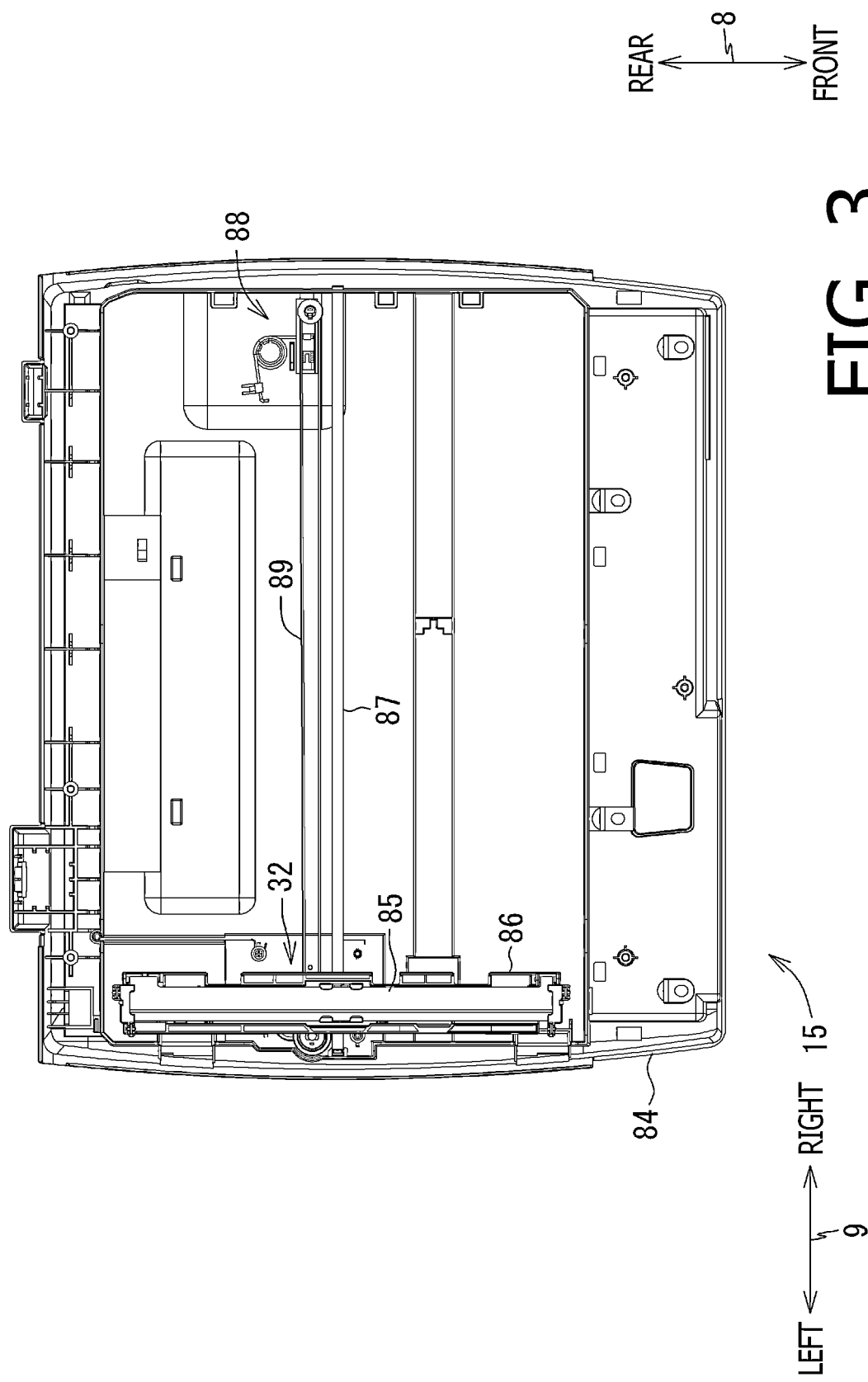
FIG. 3 is a plan view to illustrate main parts in the scanner 3 located to be lower than a platen glass 80 according to the embodiment of the present disclosure.

As shown in FIG. 3, a guide shaft 87 extends across a casing 84 in the crosswise direction 9. With the CIS carriage 86 being attached to the guide shaft 87, the first image reading unit 32 is movably supported by the guide shaft 87 to move in a direction intersecting orthogonally with a lengthwise direction of the CIS carriage 86, i.e., the crosswise direction 9, in the range underneath the platen glass 80. Along the guide shaft 87, a CIS carriage-driving assembly 88 is arranged. The CIS carriage-driving assembly 88 includes a timing belt 89 strained around pulleys (unsigned). The CIS carriage 86 is fixed to the timing belt 89 in the CIS carriage-driving assembly 88 and is moved by a circulating motion of the timing belt 89 to reciprocate in the crosswise direction 9. In this arrangement, when the scanner 3 is used as the FBS, the CIS carriage 86 may move in parallel with the lower surface of the platen glass 80 while the first CIS 85 mounted on the CIS carriage 86 may read the image of the original document 12 placed on the platen glass 80.

Figure 2:
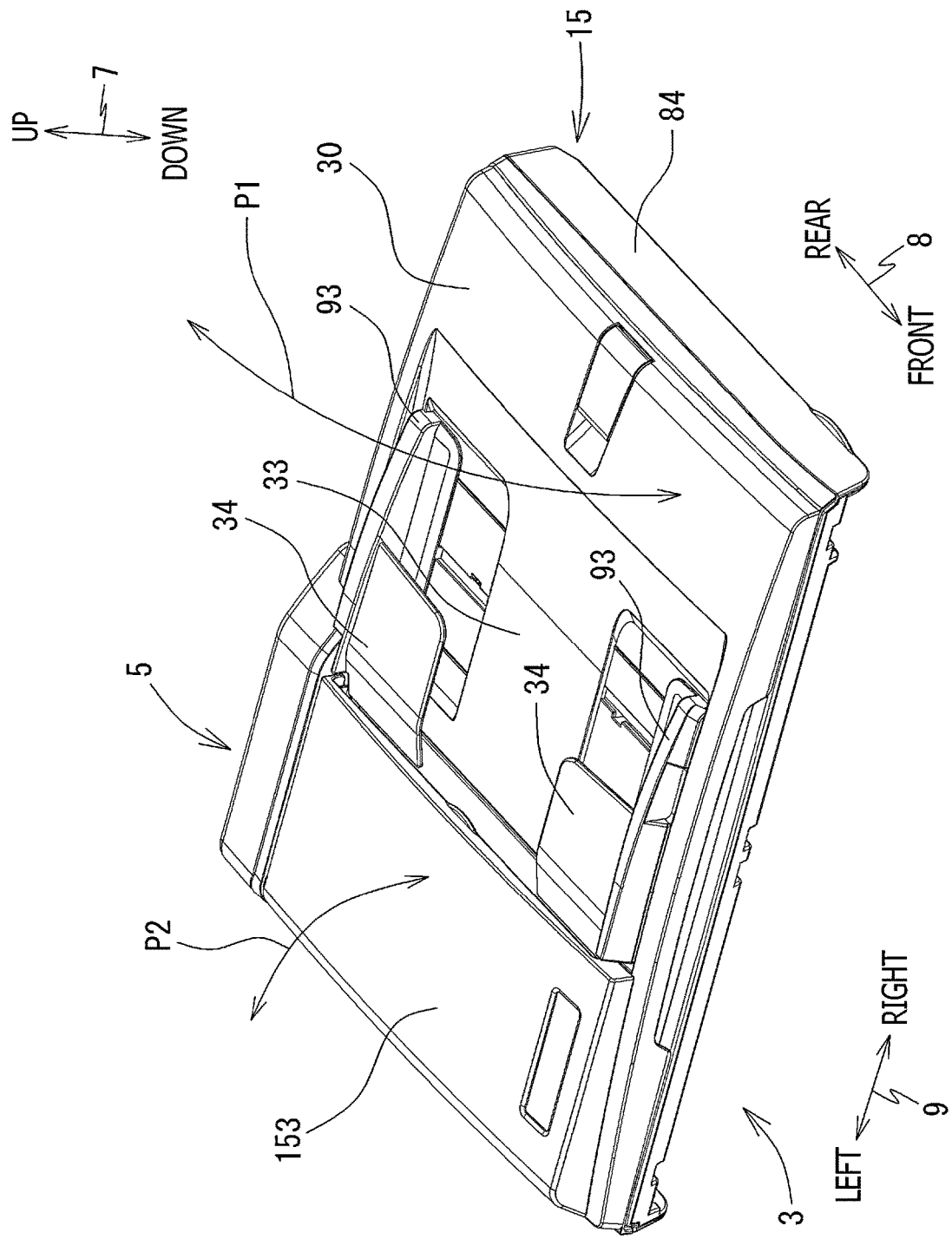
FIG. 2 is a perspective view of an exterior appearance of a scanner 3 according to the embodiment of the present disclosure.

The document cover 30, forming an upper part of the scanner 3, has, as shown in FIGS. 1-2, the ADF document tray 33 and the ADF ejection tray 34, which are arranged vertically in tiers. In the ADF document tray 33, paired ADF document guides 93, which are slidably movable in the front-rear direction 8, are arranged to be spaced from each other in the front-rear direction 8. The ADF document guides 93 stand on the ADF document tray 33 to regulate a widthwise position of the original document 12 placed on the ADF document tray 33.

The ADF document guides 93 may have a known linkage mechanism, such as rack-and-pinion, by which moving one of the ADF document guides 93 slidably in one way along the front-rear direction 8 causes the other of the ADF document guides 93 to move slidably in the other way along the front-rear direction 8.

The ADF ejection tray 34 is formed integrally with the paired ADF document guides 93 and to be spaced above from the ADF document tray 33. The ADF ejection tray 34 may have a form of cave-like plates, which project inward in the front-rear direction 8 from upper edges of the ADF document guides 93. The ADF ejection tray 34 is located to be lower than an upper surface of an upper tray 179 (see FIG. 4), which forms a lower ejection guide in an ejecting chute section 158 described below.

The original document 12 may include one or more sheets. One of the sheets in the original document 12 ejected from the ADF 5 may be held at frontward and rearward edges thereof by the ADF ejection tray 34 at a position separated from the other sheets in the original document 12 remaining on the ADF document tray 33. The ADF ejection tray 34 has a length shorter than a length of the original document 12 in an ejecting orientation to eject the original document 12. Therefore, a leading edge of the original document 12 in the ejecting orientation may fall off from the ADF ejection tray 34 and rest on the ADF document tray 33.

As shown in FIG. 4, the casing of the ADF 5 includes an ADF body 152, which is formed integrally with the document cover 30, and an ADF cover 153, which is pivotable with respect to the ADF body 152. The ADF cover 153 mainly forms an upper face of the casing of the ADF 5. The ADF cover 153 is pivotable with respect to the ADF body 152 around a pivot axis (unsigned), which is arranged sideward, e.g., leftward in FIG. 4, in the ADF body 152, in a direction indicated by an arrow P2. With the pivotable ADF cover 153, an inner part of the ADF 5 may be exposed.

The ADF cover 153 may change postures thereof between a closed posture and an open posture by pivoting with respect to the ADF body 152. When the ADF 5 is used, the ADF cover 153 is placed in the closed posture. The ADF cover 153 in the closed posture may be braced to the ADF body 152.

Inside the ADF 5, in the conveyer path 151, the conveyer 16 for conveying the original document 12 in a conveying orientation 17 from the ADF document tray 33 toward the ADF ejection tray 34 is arranged. The conveyer 16 includes first rollers 164, 166, second rollers 168, 169, and third rollers 171, 172.

The conveyer path 151 is approximately in a shape of 90-degrees rotated U in a cross-sectional view and includes a lower conveyer path 159, a curved path 157, and an upper conveyer path 160. The conveyer path 151 may be formed of the ADF body 152 and the ADF cover 153.

From the ADF document tray 33 continuously to the conveyer path 151, a draw-in chute section 154 is formed. The draw-in chute section 154 in the ADF 5 is formed continuously with an area above the ADF document tray 33. The draw-in chute section 154 has an upper surface serving as a guide surface to guide the original document 12 and serves as a passage having a predetermined dimension in the vertical direction 7. In the present embodiment, a downward surface and an upward surface of the original document 12 placed on the ADF document tray 33 may be called as a first side 51 and a second side 52, respectively, and the original document 12 may be placed on the ADF document tray 33 in a posture, in which the first side 51 faces downward, with a leading edge in the conveying orientation 17 being inserted in the draw-in chute section 154.

In the draw-in chute section 154, a sheet-feeding assembly including a plurality of rollers is arranged. The sheet-feeding assembly includes a draw-in roller 164, which is one of the first rollers 164, 166, a draw-nipping piece 165 pressed against the draw-in roller 164, a separating roller 166, which is the other of the first rollers 166, and a separator-nipping piece 167 pressed against the separating roller 166. In the meantime, the configuration of the sheet-feeding assembly may not necessarily be limited to the draw-in roller 164, the draw-nipping piece 165, the separating roller 166, and the separator-nipping piece 167, but the first rollers 164, 166 and the nipping pieces 165, 167 are merely examples of the components in the sheet-feeding assembly, and the sheet-feeding assembly may be modified to any known sheet-feeding assembly. For example, the quantity and/or arrangement of the rollers and the nipping pieces may be modified. For another example, the nipping pieces may be replaced with pinch rollers.

The draw-in roller 164 is rotatably arranged at a position approximately center of the draw-in chute section 154 in a direction of sheet width, e.g., the front-rear direction 8. Meanwhile, although not shown in the drawings, the draw-in roller 164 has a key groove to mesh with a key in a roller shaft thereof. A length of the key groove in a circumferential direction is substantially greater than a length of the key in the circumferential direction. Therefore, the draw-in roller 164 may idle with respect to the roller shaft by approximately one rotational round.

The separating roller 166 is rotatably arranged at a downstream position spaced apart from the draw-in roller 164 in the conveying orientation 17. The draw-in roller 164 and the separating roller 166 may be driven by a driving force from an LF conveying motor 110 (see FIG. 5) to rotate.

The draw-nipping piece 165 is located at a position to face the draw-in roller 164 and is vertically movable to be closer to or farther from the draw-in roller 164. The draw-nipping piece 165 is urged downward by a spring, which is not shown, and is in contact with the draw-in roller 164 when not nipping the original document 12.

The separator-nipping piece 167 is located at a position to face the separating roller 166 and is vertically movable to be closer to or farther from the separating roller 166. The separator-nipping piece 167 is urged downward by a spring, which is not shown, and is pressed against a rolling surface of the separating roller 166 when not nipping the original document 12.

The conveyer path 151 connects the ADF document tray 33 and the ADF ejection tray 34 and includes the curved section 54, which turns upward from a lower position. The conveyer path 151 is formed continuously from the draw-in chute section 154, through the lower conveyer path 159, the curved path 157, the upper conveyer path 160, to the ejection chute section 158.

The lower conveyer path 159 of the conveyer path 151 is formed as a passage having a predetermined width in the front-rear direction 8 and inclining moderately, continuously from a position in vicinity to an exit of the draw-in chute section 154 to a position in vicinity to an exit of the readable range 80A. The original document 12 conveyed from the draw-in chute section 154 may be guided in the lower conveyer path 159 smoothly without being bent forcibly.

Along the lower conveyer path 159, a second pinch roller 169, which is one of the second rollers 168, 169, a second conveying roller 168, which is the other of the second rollers 168, 169, a document sensor 116, the positioning member 83, a second image reading unit 94, a document guide 173, and a first image reading unit 32 are arranged in this recited order from upstream to downstream in the conveying orientation 17.

The second pinch roller 169 is rotatably arranged in a posture such that an axial direction thereof coincides with a widthwise direction, i.e., the front-rear direction 8, of the lower conveyer path 159 and such that a rolling surface thereof is partly exposed to the lower conveyer path 159.

At a position to face the second pinch roller 169 across the lower conveyer path 159, the second conveying roller 168 is arranged. The second conveying roller 168 is rotatably arranged in a posture such that an axial direction thereof coincides with the widthwise direction, i.e., the front-rear direction 8, of the lower conveyer path 159 and such that a rolling surface thereof is partly exposed to the lower conveyer path 159.

While the second pinch roller 169 is urged toward the second conveying roller 168 by an urging member such as a coil spring, which is not shown, a rolling surface of the second pinch roller 169 is urged against a rolling surface of the second conveying roller 168. The second conveying roller 168 is coupled with the LF conveying motor 110 (see FIG. 5) through a driving force transmitter, which is not shown, and is driven by the driving force from the LF conveying motor 110 to rotate. An outer diameter of the second conveying roller 168 is substantially larger than an outer diameter of the second pinch roller 169.

In the lower conveyer path 159, at a position downstream from the second rollers 168, 169, the document sensor 116 is located. The document sensor 116 may detect a leading edge and a trailing edge of the original document 12 being conveyed by the second rollers 168, 169.

In the lower conveyer path 159, at a position downstream from the document sensor 116, the second image reading unit 94 is located. The second image reading unit 94 includes the second CIS 95, a second platen 96, and a document supporting member 97. The second image reading unit 94 may read the second side 52 of the original document 12.

The second CIS 95 is located to face an upper surface of the second platen 96. The second CIS 95 is located at a position in the conveyer path 151 upstream from the first CIS 85 in the conveying orientation 17. The second CIS 95 may optically read the image of the original document 12 being conveyed in the conveyer path 151 from above. The second CIS 95 has a shape of a rectangular block and is mounted on the upper surface of the second platen 96.

The second platen 96 is located above the lower conveyer path 159. The second platen 96 is a plate having a predetermined thickness. A lower surface of the second platen 96 is substantially parallel to the original document 12 being conveyed in the lower conveyer path 159. The second platen 96 has a reading surface 120, an upstream edge 121, and a downstream edge 122.

The reading surface 120 spreads along the conveying orientation 17. The reading surface 120 may be substantially parallel to the second side 52 of the original document 12 being conveyed in the lower conveyer path 159.

The upstream edge 121 is an edge of the second CIS 95 on an upstream side in the conveying orientation 17. The downstream edge 122 is an edge of the second CIS 95 on a downstream side in the conveying orientation 17. The upstream edge 121 is located at an upper position with respect to the downstream edge 122 along the conveying orientation 17.

The document supporting member 97 is pivotably supported by a shaft, which extends along the front-rear direction 8, at an upstream end thereof in the conveying orientation 17. The document supporting member 97 is pivotable in a direction to approach or separate from the second platen 96. The document supporting member 97 is urged toward the reading surface 120 by a spring member, which is not shown. In a condition where substantially no external force is applied to the document supporting member 97, the document supporting member 97 is located at a position to face the reading surface 120 of the second platen 96 across the conveyer path 151.

In the lower conveyer path 159, the positioning member 83 is located at a position downstream from the second image reading unit 94 in the conveying orientation 17. A leftward side of the positioning member 83, i.e., a downstream side in the conveying orientation 17, forms a slant surface, which inclines downward to the left along the conveying orientation 17. The positioning member 83 may guide the original document 12 passing through the second image reading unit 94 to a position between the platen glass 80 and the document guide 173.

Along the lower conveyer path 159, the first image reading unit 32 is located at a position downstream from the positioning member 83 in the conveying orientation 17. The first image reading unit 32 may read an image of the first side 51 of the original document 12. However, the position of the image reading unit 32 may not necessarily be limited as long as the first image reading unit 32 is located at a position downstream from the positioning member 83 in the conveying orientation 17.

The document guide 173 is located in the document cover 30 at a position to face the first image reading unit 32. The document guide 173 includes a horizontal part, which faces the readable range 80A, and slant parts, which extend obliquely upward from an upstream end and a downstream end of the horizontal part. The document guide 173 is urged toward the readable range 80A by a spring member fixed to the ADF body 152. At both ends of the horizontal part of the document guide 173 in the front-rear direction 8, downward protrusions are formed. With the protrusions contacting the readable range 80A, a clearance in the vertical direction 7, through which the original document 12 may pass, is reserved between the horizontal part of the document guide 173 and the readable range 80A.

The curved path 157 in the conveyer path 151 starts from a position in vicinity to an exit of the readable range 80A, extends upward, and curves from left to right in FIG. 4. A downstream end of the curved path 157 in the conveying orientation 17 is continuous with the upper conveyer path 160. The curved path 157 has an inner conveyance guide surface formed of a third conveying roller 171, which is one of the third rollers 171, 172, and an outer conveyance guide surface, which is formed of a part of the ADF body 152 and a part of the ADF cover 153.

Along the curved path 157, the third conveying roller 171 and a third pinch roller 172, which is the other of the third rollers 171, 172, are arranged. The third conveying roller 171 is located on an inner side of the curved path 157, and the third pinch roller 172 is located on an outer side of the curved path 157. The third conveying roller 171 and the third pinch roller 172 are partly exposed to the curved path 157.

The third pinch roller 172 is urged toward the third conveying roller 171 by an urging member such as a coil spring, which is not shown. Therefore, the in the curved path 157, a rolling surface of the third pinch roller 172 is urged against a rolling surface of the third conveying roller 171. The third conveying roller 171 is coupled with the LF conveying motor 110 (see FIG. 5) through a driving force transmitter, which is not shown, and is driven by the driving force from the LF conveying motor to rotate.

In an upstream area in the upper conveyer path 160 along the conveying orientation 17, an ejecting chute section 158 is formed. The ejecting chute section 158 has an upper guiding surface, which is formed of an inner surface of the ADF cover 153. The ejecting chute section 158 has a lower guiding surface, which is formed of the upper tray 179 and a slant section 180 formed continuously leftward from the upper tray 179. The ejecting chute section 158 serves as a passage having a predetermined dimension in the vertical direction 7 delimited by these guiding surfaces. When the original document 12 is conveyed to the ejecting chute section 158, the original document 12 may be guided to the ADF ejection tray 34 by the guiding surfaces of the ejecting chute section 158. The slant section 180 is a surface inclining lower-leftward from the upper tray 179. The upper tray 179 is located to be higher than a nipping position between the third conveying roller 171 and the third pinch roller 172.

The slant section 180 is located at a position downstream from a spring piece 190 in the conveying orientation 17. The slant section 180 has a slant surface, which rises toward the upper tray 179. An upper end of the slant surface of the slant section 180 is located to be higher than the nipping position between the third conveying roller 171 and the third pinch roller 172.

The spring piece 190 is arranged in the ejecting chute section 158. The spring piece 190 may support the trailing end of the original document 12 entering the ejecting chute section 158. The spring piece 190 is located at an immediately downstream position with respect to the nipping position between the third conveying roller 171 and the third pinch roller 172 in the conveying orientation 17. The spring piece 190 is formed approximately in an L-bent shape in a cross-sectional view. The spring piece 190 may be a resilient plate member made of, for example, synthetic resin such as polyethylene terephthalate (PET), having a thickness which is approximately from 0.2 mm to 1.00 mm. The spring piece 190 may deform vertically in the cross-sectional view according to an intensity of a load being applied thereto.

[Driving Control on Scanner 3]

Figure 5:
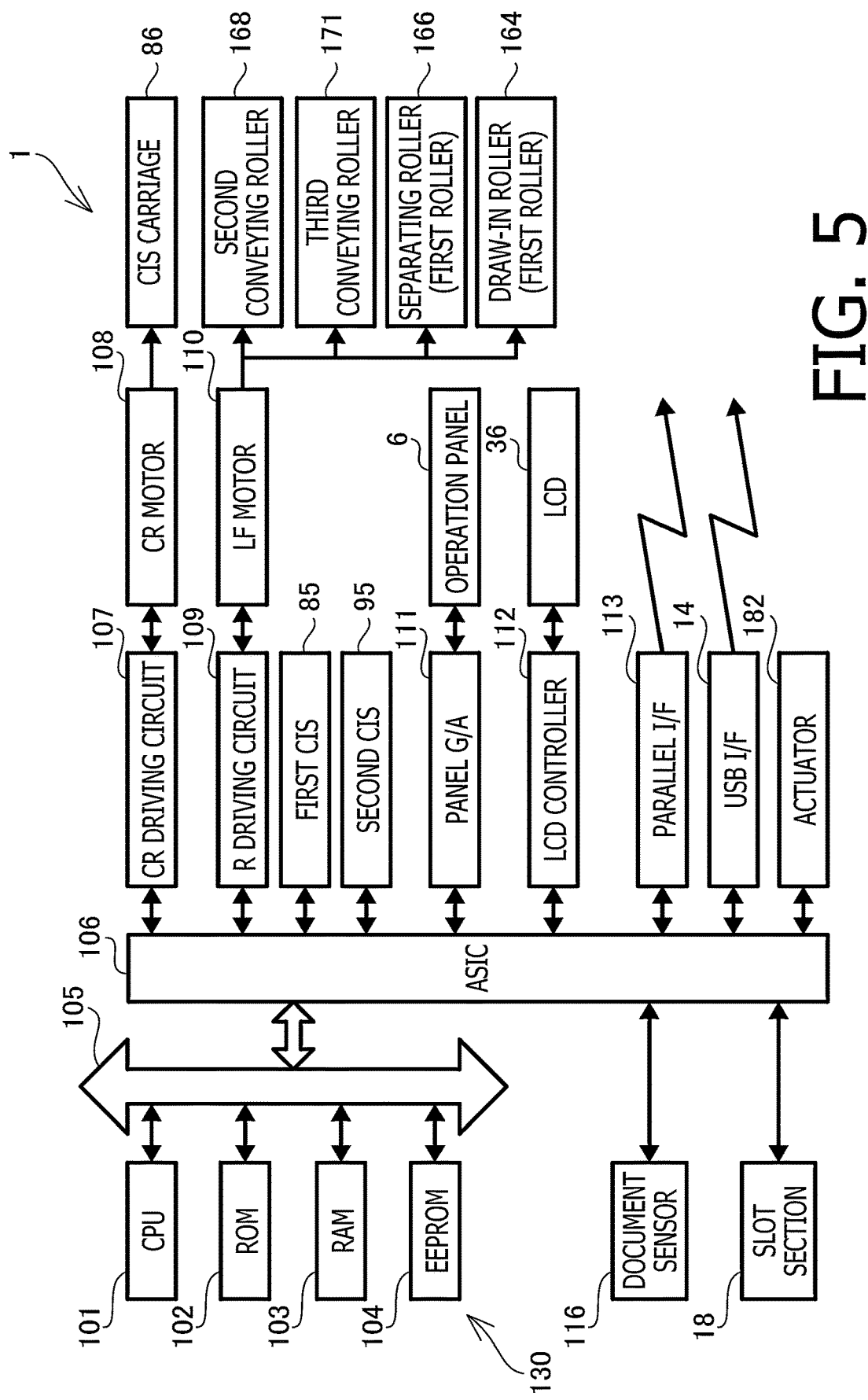
FIG. 5 is a block diagram to illustrate functional configuration of the scanner 3 according to the embodiment of the present disclosure.

FIG. 5 illustrates a configuration of the controller 130 and peripheral devices thereof in the MFD 1. The controller 130 may control not only the scanner 3 but also overall operations in the MFD 1 including operations of the printer 2. However, in this description with reference to FIG. 5, components in the printer 2 are omitted. The controller 130 may be a microcomputer, mainly formed of, but not limited to, a Central Processing Unit (CPU) 101, a Read Only Memory (ROM) 102, a Random Access Memory (RAM) 103, an Electrically Erasable and Programmable ROM (EEPROM) 104, which are connected to an Application Specific Integrated Circuit (ACIC) 106.

The ROM 102 stores programs to control operations of the MFD 1. The EEPROM 104 stores various types of data to be processed in the operations by the programs stored in the ROM 102. The RANI 103 may serve as a storage area to temporarily store various types of data to be used when the CPU 101 runs the programs and a spreading area for various types of data and programs.

The CPU 101 may control peripheral devices composing the controller 130 and devices that may be controlled by the controller 130 generally. The CPU 101 may read the programs stored in the ROM 102 and the data stored in the RANI 103 or the EEPROM 104 and conduct computations in accordance with the programs.

The ASIC 106 may, in accordance with the commands from the CPU 101, generate phase excitation signals to drive the carriage motor 108 (indicated as "CR motor" in FIG. 5) in the scanner 3 and the LF conveyer motor 110 (indicated as "LF motor 110" in FIG. 5) in the ADF 5 and distribute the signals to a CR driving circuit 107 in the carriage motor 108 and an R driving circuit 109 in the LF conveyer motor 110. By the driving signals transmitted through the CR driving circuit 107 and the R driving circuit 109 to the carriage motor 108 and the LF conveyer motor 110, rotations of the carriage motor 108 and the LF conveyer motor 110 may be controlled.

The CR driving circuit 107 may drive the carriage motor 108 connected with the CIS carriage 86 in the scanner 3. The CR driving circuit 107 receiving the signals output from the ASIC 106 may generate electrical signals to rotate the carriage motor 108. The carriage motor 108 receiving the electric signals may rotate, and the rotational force of the carriage motor 108 may be transmitted to the CIS carriage 86 through a known scanning assembly, the CIS carriage 86 may move.

The R driving circuit 109 may drive the LF conveyer motor 110 connected with the draw-in roller 164, the separating roller 166, the second conveying roller 168, and the third conveying roller 171 in the ADF 5. The R driving circuit 109 receiving the signals output from the ASIC 106 may generate electrical signals to rotate the LF conveyer motor 110. The LF conveyer motor 110 receiving the electric signals may rotate, and the rotational force of the LF conveyer motor 110 may be transmitted to the draw-in roller 164, the separating roller 166, the second conveying roller 168, and the third conveying roller 171 through a known driving assembly including gears and driving shafts.

The ASIC 106 is connected with the first CIS 85 and the second CIS 95, which may read an image of the original document 12, in the scanner 3. The ASIC 106 may transmit electric signals for emitting light from a light source and timing signals for outputting image data from the photoelectric conversion elements to the first CIS 85 and the second CIS 95. The first CIS 85 and the second CIS 95 receiving these signals may emit light at the original document 12 at a predetermined timing and output image data converted by the photoelectric conversion elements.

The ASIC 106 is connected with a panel gate array (G/A) 111 to control operation buttons 35, through which commands from a user may be input in the MFD. The panel gate array 111 may detect pressing actions on the operation buttons 35 in the operation panel 6 and output predetermined key code signals, while key codes are assigned to each of the operation buttons 35. The CPU 101 receiving the key codes from the panel gate array 111 may perform controlling processes corresponding to the received key codes with reference to a predetermined key processing table. The key processing table may be a table, in which the key codes and the controlling processes are associated, and may be stored in, for example, the ROM 102.

The ASIC 106 is connected with an LCD controller 112, which may control screens to be displayed in the LCD 36. The LCD controller 112 may cause the LCD 36 to display information regarding operations of the printer 2 or the scanner 3.

The ASIC 106 is connected with the slot section 18, in which memory cards may be inserted, and with a parallel interface 113 and a USB connector 14, through which data may be exchanged with a computer through a parallel cable and a USB cable, respectively.

The ASIC 106 is connected with the document sensor 116, which may detect a leading edge and a trailing edge of the original document 12 in the conveyer path 151 (see FIG. 4) in the ADF 5.

[Reading Images of Original Document 12 by ADF 12]

In the scanner 3 in the configuration as described above, the controller 130 may control the conveyer 16, the first CIS 85, and the second CIS 95. The control to read images of the original document 12 in the ADF 12 will be described below with reference to FIGS. 4-9.

For reading images of a plurality of sheets contained in the original document 12, a user may place the original document 12 on the ADF document tray 33 in a posture, in which the first sides 51 of the sheets in the original document 12 face downward. The user may enter a command, which causes the scanner 3 to start reading the original document 12, through the operation panel 6.

The controller 130 receiving the command may drive the CR motor 108 and the LF motor 110. As the LF motor 100 runs, and the draw-in roller 164, the separating roller 166, and the second conveying roller 168 may rotate, and a lowermost one of the sheets in the original document 12 may be conveyed from the ADF document tray 33. Moreover, as the CR motor 108 runs, the first CIS 85 may move to a position in the readable range 80A.

The document sensor 116 may detect a leading edge of the sheet being conveyed from the original document 12 in the ADF document tray 33. The controller 130 may control the sheet to be conveyed by a predetermined distance based on detection signals from the document sensor 116 and control the second CIS 95 and the first CIS 85 to start reading the image of the sheet.

The sheet from the original document 12 conveyed in the lower conveyer path 159 is in a posture, in which the first side 51 faces downward and the second side 52 faces upward. The second CIS 95 in the second image reading unit 94 may read the image on the second side 52 of the sheet. Meanwhile, the reading surface 120 is in the posture such that the upstream edge 121 is higher than the downstream edge 122. Therefore, the light emitted from the second CIS 95 is, as indicated by an arrow (see FIGS. 6-9), originating from the second CIS 95 toward the document supporting member 97, in an orientation to be away from the first reading unit 32.

The sheet, of which image on the second side 52 is read by the second image reading unit 94, may be guided by the positioning member 83 and reach the first image reading unit 32, and the first CIS 85 in the first image reading unit 32 may read the image on the first side 51 of the sheet passing over the readable range 80A. When the first CIS 85 is reading the image on the first side 51 of the sheet, the light emitted from the first CIS 85 originates, as indicated by an arrow (see FIGS. 7, 9), from the first CIS 85 toward the document guide 173, which is a different orientation from the orientation of the light in the second image reading unit 94. After the image on the first side 51 is read by the first CIS 85, the sheet may be conveyed to the curved path 157 in the ADF 5 with the leading edge being guided upward.

Figure 7:
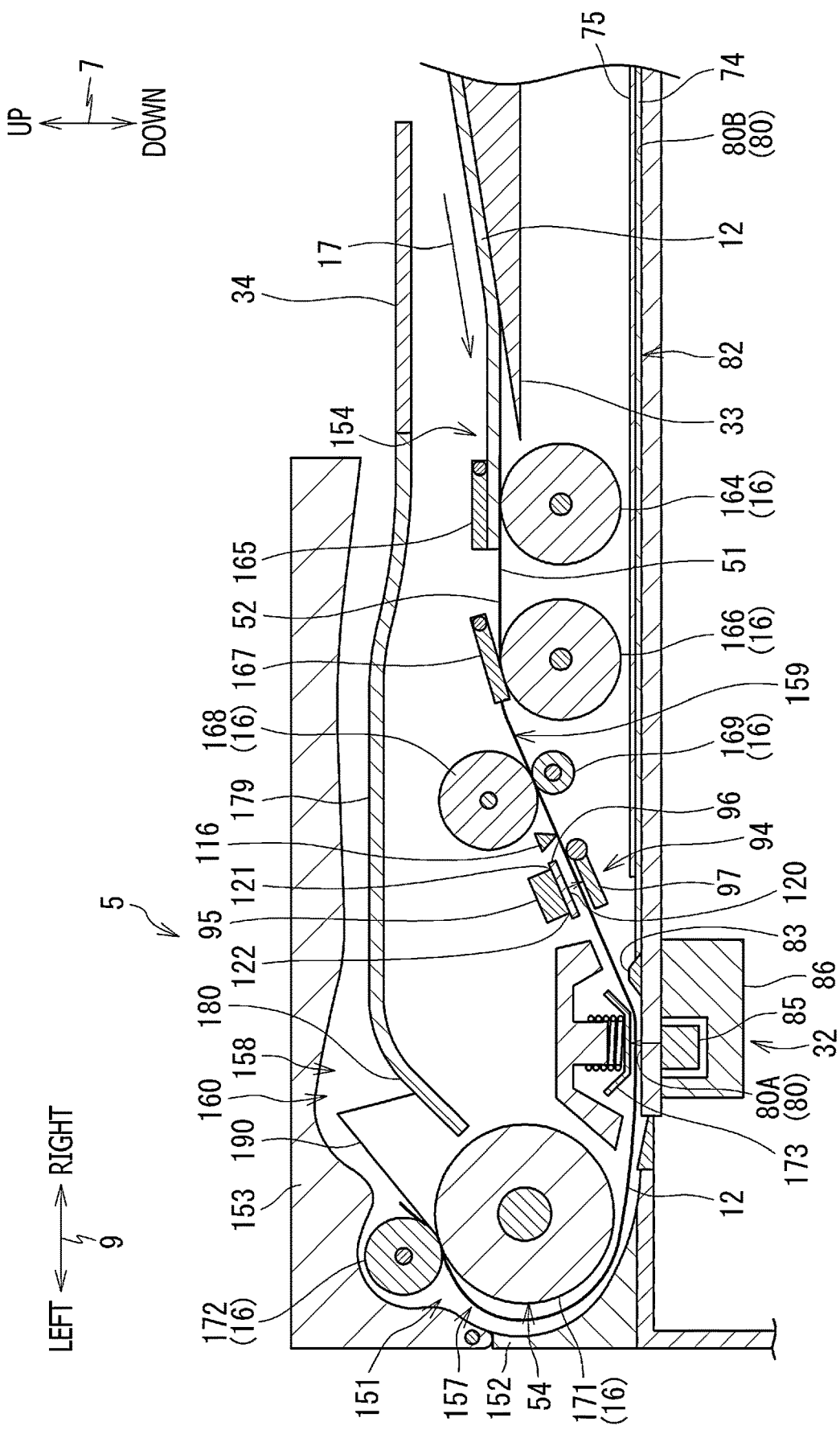
FIG. 7 is a cross-sectional view to illustrate the original document 12 being conveyed in a curved path 157 of the conveyer path 151 in the ADF 5 according to the embodiment of the present disclosure.

As shown in FIG. 7, the sheet of the original document 12 conveyed to the curved path 157 may be further conveyed around an outer peripheral surface of the third conveying roller 171 curving from left to right. The third pinch roller 172 may be rotated by the rotation of the third conveying roller 171. The sheet may be pressed by the third pinch roller 172 against the third conveying roller 171, and the rotational force of the third conveying roller 171 may be applied to the sheet. Therefore, the sheet may be conveyed through the curved path 157 downstream to the upper conveyer path 160.

As the sheet from the original document 12 conveyed through the curved path 157 is nipped by the third conveying roller 171 and the third pinch roller 172 and further conveyed downstream in the conveying orientation 17, the leading edge of the sheet may climb the slant surface of the spring piece 190, which inclines upward to downstream in the conveying orientation 17. Meanwhile, with the weight of the sheet on the spring piece 190, the spring piece 190 may deform downward. Accordingly, the sheet may be supported resiliently by the spring piece 190 and guided downstream along the conveying orientation 17 in the ejecting chute section 158.

While the sheet from the original document 12 is being conveyed, the document sensor 116 may detect the trailing end of the sheet. The controller 130 may convey the sheet by a predetermined distance based on the detection signals from the document sensor 116 and thereafter finish reading the images by the second CIS 95 and the first SIC 85. Further, the controller 130 may convey the sheet with the images having been read by a predetermined distance to the ADF ejection tray 34 to eject.

Figure 8:
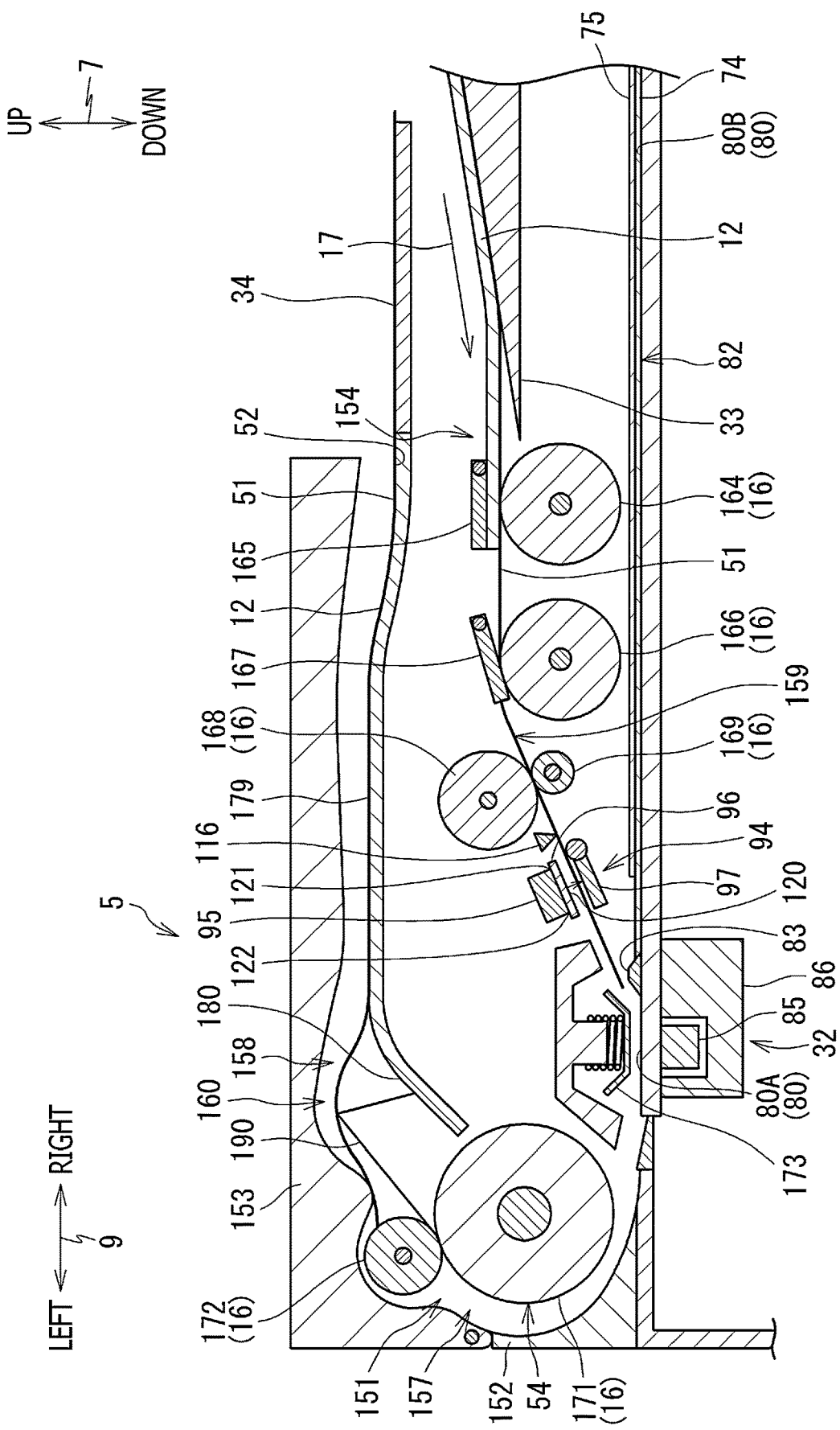
FIG. 8 is a cross-sectional view to illustrate a sheet of the original document 12 being conveyed in an upper conveyer path 160 of the conveyer path 151 in the ADF 5 according to the embodiment of the present disclosure.

Once the trailing edge of the sheet exits the nipping position between the third conveying roller 171 and the third pinch roller 172, an amount of the load on the spring piece 190 may be reduced to a weight from the trailing end part of the sheet alone. Therefore, as shown in FIG. 8 the trailing end part of the sheet may be lifted upward by the resilient force of the spring piece 190. The sheet guided to the upper tray 179 may be guided to the ADF ejection tray 34, which is located downstream in the conveying orientation 17.

While the trailing part of the sheet ejected at the ADF ejection tray 34 may remain in the ejection chute section 158, but the leading part of the sheet may be supported by the ADF ejection tray 34, which is located to be lower than the upper tray 179. Therefore, an amount of load on the leading part of the sheet may increase, and an amount of load on the trailing part of the sheet may be reduced, and the trailing part may be uplifted. In the ADF ejection tray 34, the first side 51 of the sheet faces upward.

Figure 6:
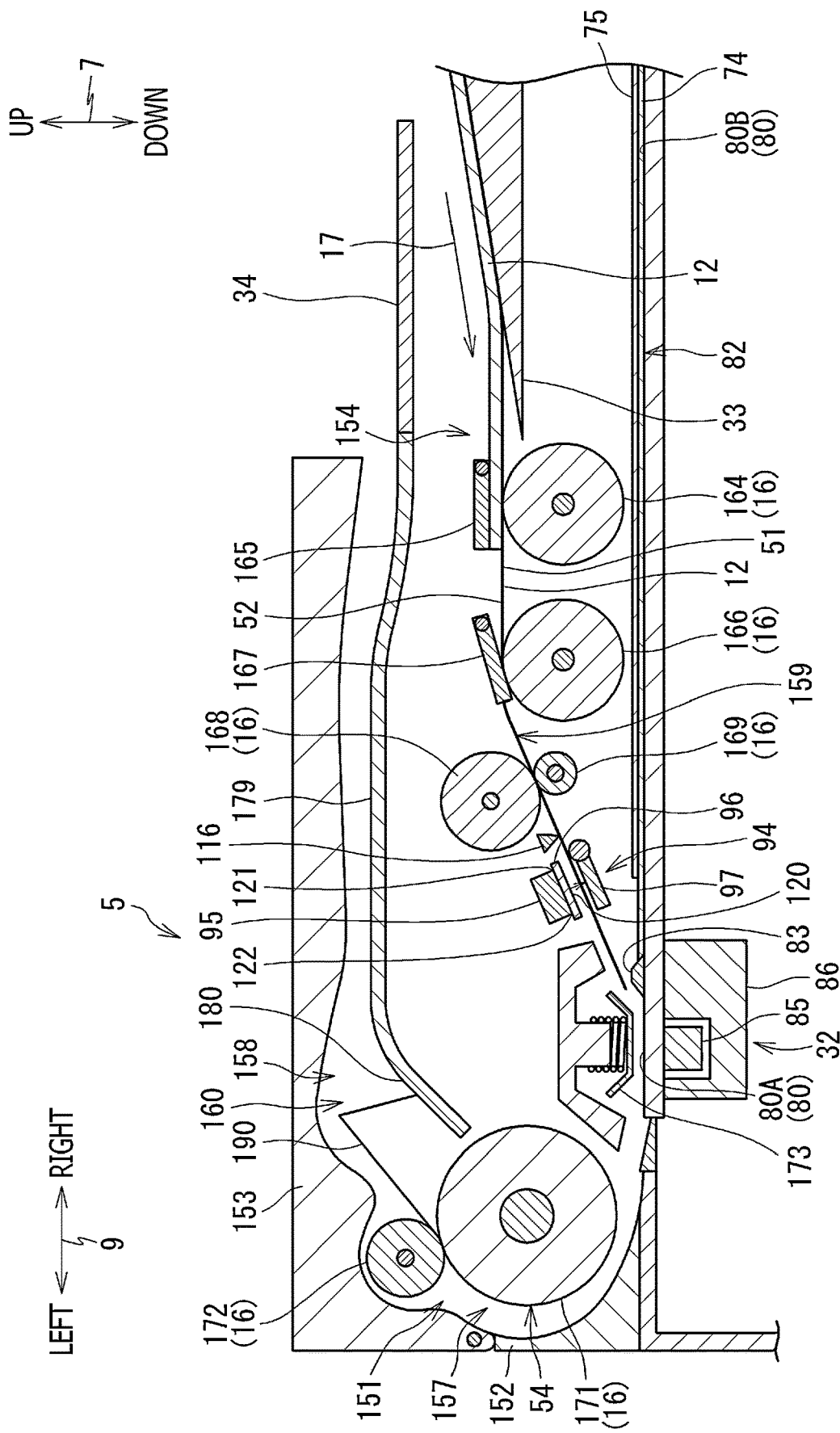
FIG. 6 is a cross-sectional view to illustrate an original document 12 being conveyed in a lower conveyer path 159 of a conveyer path 151 in the ADF 5 according to the embodiment of the present disclosure.

As shown in FIG. 6, the lowermost one of the sheets in the original document 12 placed on the ADF document tray 33 may be thus conveyed by the draw-in roller 164 and the separating roller 166 and further conveyed by the second conveying roller 168. Meanwhile, a conveying velocity to convey the sheet by the separating roller 166 and the second conveying roller 168 is faster than a conveying velocity to convey the sheet by the draw-in roller 164. Therefore, when the sheet is conveyed by the separating roller 166 and the second conveying roller 168, the draw-in roller 164 may be pulled by the separating roller 166 and the second conveying roller 168 through the sheet, and the draw-in roller 164 may stop rotating while the key in the rotating shaft and the key groove in the draw-in roller 164 are separated, until the key catches up with the key groove. Therefore, the trailing edge of the lowermost one of the sheets in the original document 12 and a leading edge of a next lowermost one of the sheets in the original document 12 may be separated by a predetermined distance. Thus, the plurality of sheets in the original document 12 may be separated from one another by the predetermined distance to be conveyed one after another in the ADF 5, and the images on the first side 51 and the second side 52 of each of the sheets conveyed one after another may be read by the first CIS 85 and the second CIS 95 respectively. Thereafter, the sheets may be ejected one after another to rest on the ADF ejection tray 34.

Figure 9:
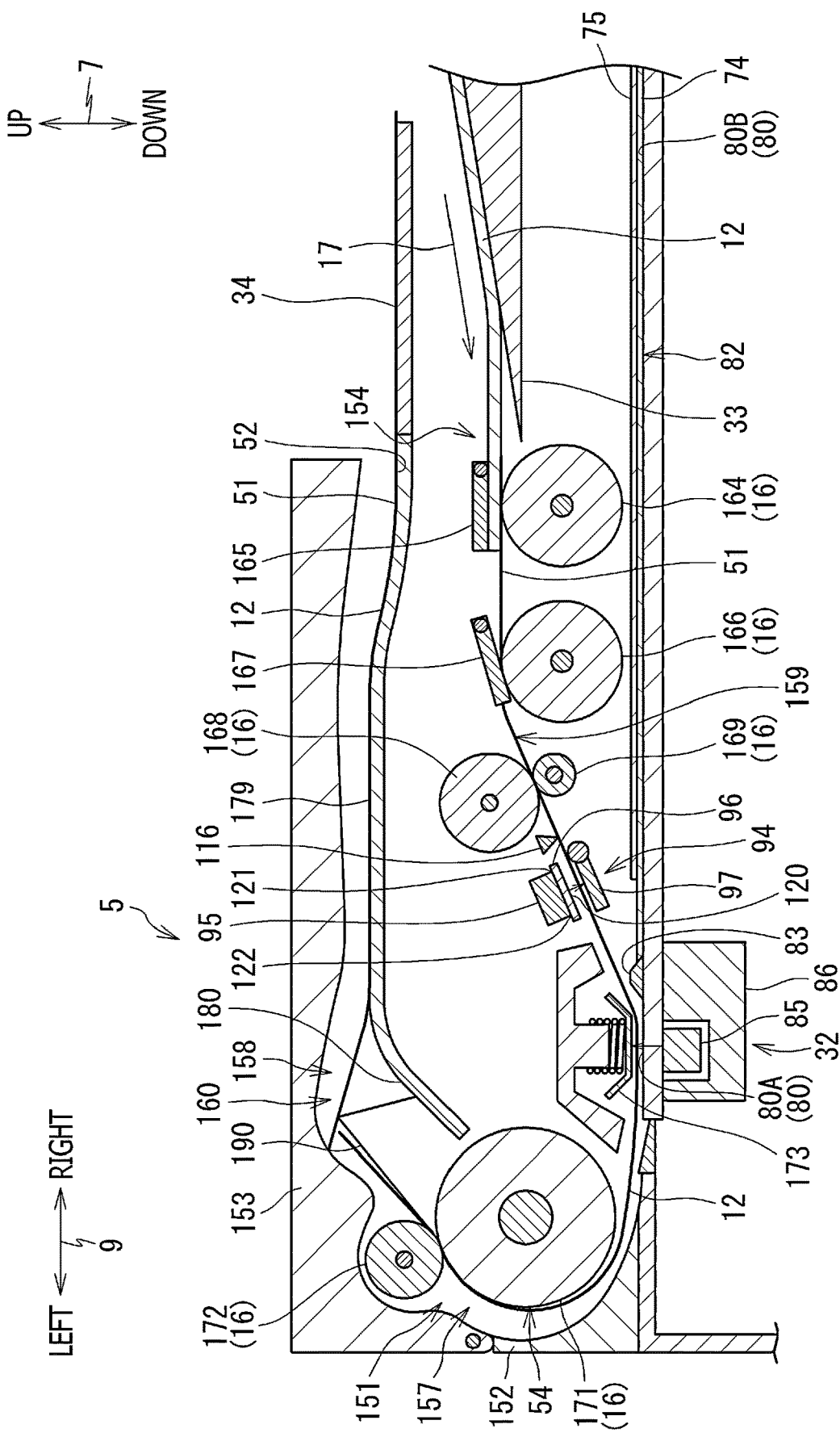
FIG. 9 is a cross-sectional view to illustrate a plurality of sheets of the original document 12 being conveyed in the upper conveyer path 160 of the conveyer path 151 in the ADF 5 according to the embodiment of the present disclosure.

FIG. 9 shows the plurality of sheets in the original document 12 are conveyed continuously in the upper conveyer path 160 of the conveyer path 151. In particular, FIG. 9 shows a condition, in which a preceding one of the sheets in the original document 12 has been conveyed to the upper conveyer path 160 of the conveyer path 151, and a succeeding one of the sheets in the original document 12 is being conveyed in the curved path 157.

When the preceding one of the sheets in the original document 12 is conveyed to the upper conveyer path 160, the trailing part of the preceding sheet is supported by the spring piece 190. Meanwhile, when the succeeding one of the sheets in the original document 12 is conveyed to the ejection chute section 158, the succeeding sheet may keep pushing the spring piece 190 downward in the same manner as the preceding sheet while being conveyed. The succeeding sheet may be conveyed by the third rollers 171, 172 upward by a predetermined angle, and the leading edge thereof may push the trailing part of the preceding sheet upward along the slant surface of the spring piece 190. Further, the leading edge of the succeeding sheet may slip underneath the trailing part of the preceding sheet. Thus, in the ADF ejection tray 34, the plurality of sheets in the original document 12 may be stacked, with their first sides 51 facing upward, in the original order, in which the sheets were initially placed on the ADF document tray 33.

[Arrangement of Devices in ADF 5]

Figure 10:
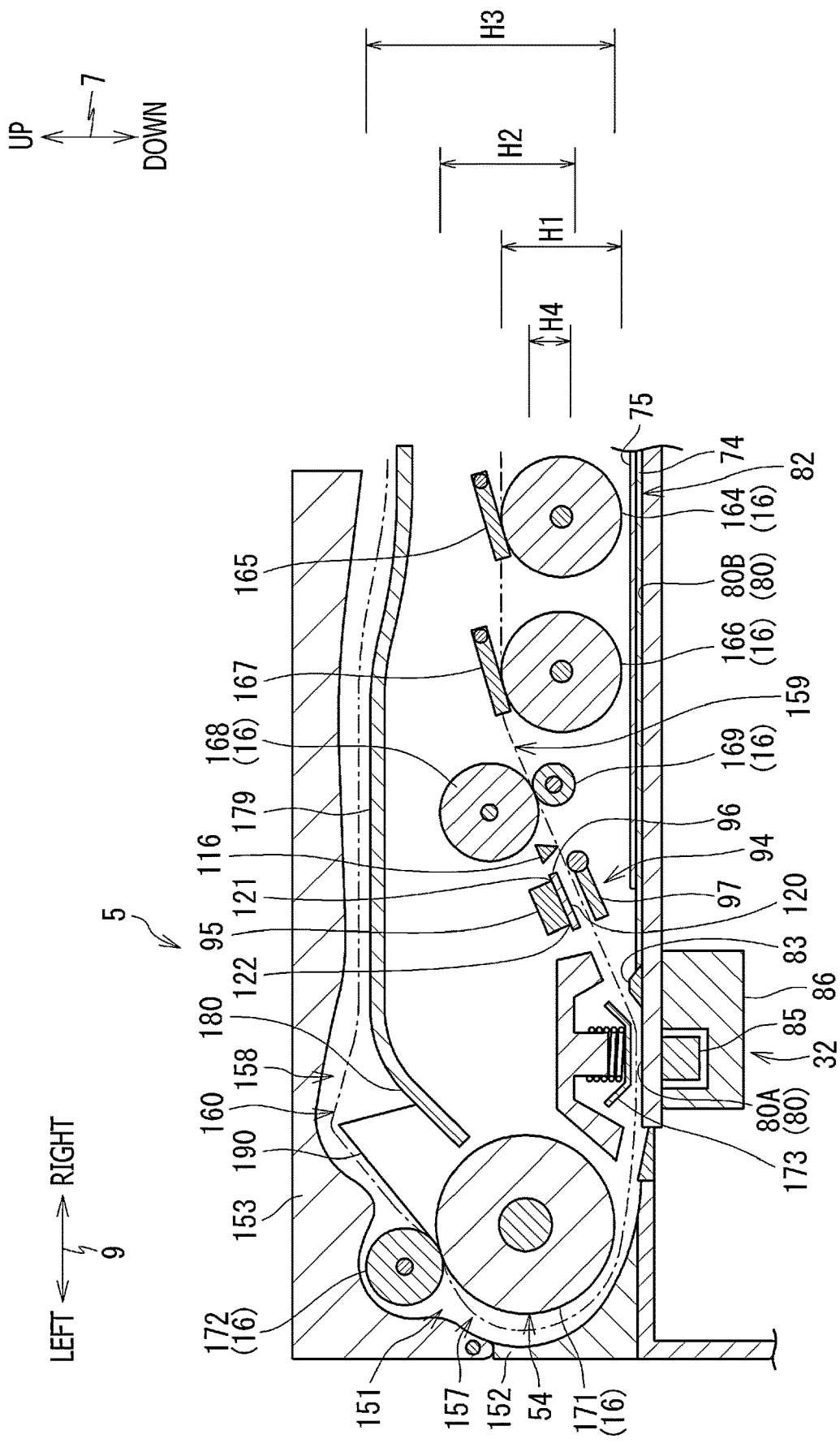
FIG. 10 illustrates a mutually overlapped arrangement of rollers and a second CIS 95 in the ADF 5 according to the embodiment of the present disclosure.
Figure 11:
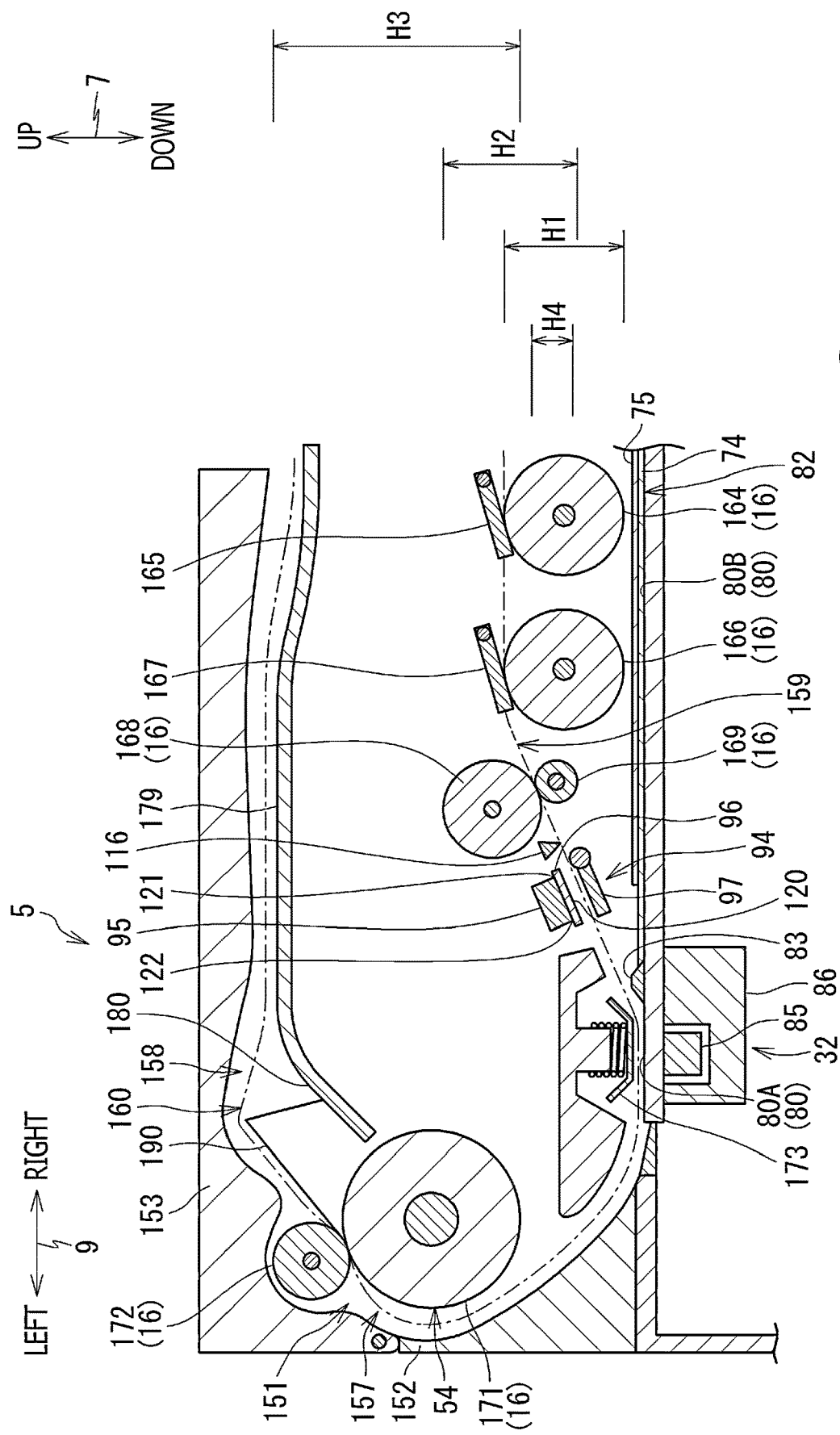
FIG. 11 illustrates a partly overlapped arrangement of the rollers and the second CIS 95 in the ADF 5.

FIGS. 10 and 11 illustrate arrangement of rollers including the first rollers 164, 166, the second rollers 168, 169, and the third rollers 171, 172 and the second CIS inside the document cover 30.

The first rollers 164, 166, the second rollers 168, 169, the third rollers 171, 172, and the second CIS 95 are arranged in a same range to at least partly overlap one another in the vertical direction 7.

As shown in FIG. 10, a range, in which the first rollers 164, 166 occupy in the vertical direction 7, will be called as a first roller range H1; a range, in which the second rollers 168, 169 occupy in the vertical direction 7, will be called as a second roller range H2; and a range, in which the third rollers 171, 172 occupy in the vertical direction 7 will be called as a third roller range H3.

The first roller range H1 is a range between an uppermost position within outer circumferential surfaces of the draw-in roller 164 and the separating roller 166 and a lowermost position within the outer circumferential surfaces of the draw-in roller 164 and the separating roller 166. In the present embodiment, dimensions and positions in the vertical direction 7 of the draw-in roller 164 and the separating roller 166 are equal; therefore, the first roller range H1 may either be a range between the uppermost position and the lowermost position of the outer circumferential surface of the draw-in roller 164 or may be a range between the uppermost position and the lowermost position of the outer circumferential surface of the separating roller 166.

The second roller range H2 is a range between an uppermost position of an outer circumferential surface of the second conveying roller 168, which is at an upper position within the second rollers 168, 169, and a lowermost position of an outer circumferential surface of the second pinch roller 169, which is at a lower position between the second rollers 168, 169.

The third roller range H3 is a range between an uppermost position of an outer circumferential surface of the third pinch roller 172, which is at an upper position within the third rollers 171, 172, and a lowermost position of an outer circumferential surface of the third conveying roller 171, which is at a lower position between the third rollers 171, 172.

Meanwhile, a range, in which the second CIS 95 occupies in the vertical direction 7 between the downstream edge 122 of the CIS 95 and an uppermost position of the second CIS 95 on the upstream side in the conveying orientation 17, will be called as a second CIS range H4. It may be noted that the dimensions of the rollers and the second CIS 95 are not necessarily limited, and largeness relation among the rollers and the second CIS 95 may be different.

As shown in FIG. 10, the first roller range H1 partly overlaps each of the second roller range H2, the third roller range H3, and the second CIS range H4. The second roller range H2 is entirely included in and overlaps the third roller range H3. Moreover, the second roller range H2 includes an entirety of the second CIS range H4 and overlaps the second CIS range H4. The third roller range H3 includes the entirety of the second CIS range H4 and overlaps the second CIS range H4. In other words, the ranges, in which the first rollers 164, 166, the second rollers 168, 169, the third rollers 171, 172 and the second CIS 95 occupy in the vertical direction 7, at least partly overlap mutually.

Meanwhile, for example, the first rollers 164, 166, the second rollers 168, 169, the third rollers 171, 172, and the second CIS 95 may be located in an arrangement as shown in FIG. 11. In this arrangement, the first roller range H1 partly overlaps each of the second roller range H2, the third roller range H3, and includes the entirety of the second CIS range H4 and overlaps the second CIS range H4. The second roller range H2 partly overlaps the third roller range H3 and includes the entirety of the second CIS range H4 and overlaps the second CIS range H4. On the other hand, the third roller range H3 does not overlap the second CIS range H4. In other words, the ranges, in which the first rollers 164, 166, the second rollers 168, 169, the third rollers 171, 172 and the second CIS 95 occupy in the vertical direction 7, do not necessarily overlap mutually.

In the arrangement such that the ranges, in which the first rollers 164, 166, the second rollers 168, 169, the third rollers 171, 172 and the second CIS 95 occupy in the vertical direction 7, at least partly overlap one another, the dimension of the reading apparatus in the vertical direction 7 may be smaller.

It may be noted that the conveyer 16 to convey the original document 12 in the conveying orientation 17 may not necessarily consist of the first rollers 164, 166, the second rollers 168, 169, and the third rollers 171, 172, but the original document 12 may be conveyed by different devices and mechanism.

Moreover, the reading sensors to read the images of the first side 51 and the second side 52 of the original document 12 in the scanner 3 may not necessarily be limited to the first CIS 85 and the second CIS 95, but reading devices in a different type may be used.

[Benefits]

According to the embodiment described above, the second CIS 95 to read the second side 52 of the original document 12 from the upper side of the conveyer path 151 is located at the position upstream in the conveying orientation 17 from the first CIS 85 to read the second side 51 of the original document 12 from the lower side of the conveyer path 151. In this arrangement, the curved section 54 of the conveyer path 151 may be located at the position immediately downstream from the first CIS 85 in the conveying orientation 17. Therefore, the dimension of the scanner 3 along the conveying orientation 17 may be reduced.

Moreover, according to the embodiment described above, the upstream edge 121 of the reading surface 120 of the second platen 96 is located to be higher than the downstream edge 122. In this arrangement, the light from the second CIS 95 may be emitted in the orientation to be farther from the first CIS 95. Therefore, the light from the CIS 95 may be restrained from affecting the reading quality of the first CIS 95.

Moreover, according to the embodiment described above, the document cover 30 has the resilient plate 82, which may contact the platen glass 80. Therefore, when the document cover 30 being closed contacts the supporting base 15, impact by the contact on the second CIS 95 may be absorbed and reduced by the resilient plate 82.

Moreover, according to the embodiment described above, the range where the first rollers 164, 166 occupy, the range where the second rollers 168, 169 occupy, the range where the third rollers 171, 172 occupy, and the range where the second CIS 95 occupies, in the vertical direction 7, at least partly overlap respectively and mutually. Therefore, the reading apparatus may be downsized in the vertical direction 7.

Although an example of carrying out the invention have been described, those skilled in the art will appreciate that there are numerous variations and permutations of the reading apparatus that fall within the spirit and the scope of the invention as set forth in the appended claims. It is to be understood that the subject matter defined in the appended claims is not necessarily limited to the specific features or act described above. Rather, the specific features and acts described above are disclosed as example forms of implementing the claims. In the meantime, the terms used to represent the components in the above embodiment may not necessarily agree identically with the terms recited in the appended claims, but the terms used in the above embodiments may merely be regarded as examples of the claimed subject matters.

For example, in the MFD 1 in the embodiment described above, the document cover 30 containing the second reading sensor is movable with respect to the supporting base 15 that may function as the FBS. However, the MFD 1 may not necessarily have the FBS. In other words, the MFD 1 may not necessarily have the document cover 30 in the scanner 3, but the ADF 5 may be installed in the casing 84.

For another example, the document supporting member 97 may not necessarily be pivotable in the direction to move closer to or farther from the second platen 96 or be urged by the spring member toward the reading surface 120, but may be, for example, fixed at a position to face the reading surface 120 of the second platen 96 across the conveyer path 151.

For another example, the quantity and/or arrangement of the rollers in the conveyer 16 of the ADF 5 described above are merely examples and may be modified optionally.

What is claimed is:

1. A reading apparatus, comprising:
   a document tray;
   an ejection tray located above the document tray;
   a conveyer path connecting the document tray and the ejection tray, the conveyer path having a curved section curving from a lower position toward an upper position;
   a conveyer configured to convey an original document in a conveying orientation from the document tray toward the ejection tray in the conveyer path, the conveyer having a plurality of rollers including a first roller and a second roller, the first roller being configured to feed the original document placed on the document tray to the conveyer path, the first roller being located on a lower side of the conveyer path most upstream in the conveying orientation among the plurality of rollers, the second roller being located downstream in the conveying orientation from the first roller;

a first reading sensor located upstream in the conveying orientation from the curved section in the conveyer path, the first reading sensor being configured to optically read a first side of the original document from below, the first side being a side of the original document that faces downward in a state where the original document is placed on the document tray;

a second reading sensor located upstream in the conveying orientation from the first reading sensor in the conveyer path, the second reading sensor being configured to optically read a second side of the original document from above, the second side being a side of the original document that faces upward in the state where the original document is placed on the document tray;

a platen glass located above the first reading sensor; and a document guide located to face the first reading sensor across the conveyer path, wherein the second roller is located upstream in the conveying orientation from the second reading sensor;

wherein the first roller is configured to contact the first side of the original document placed on the document tray from below for feeding, wherein the second reading sensor has a reading surface spreading along the conveying orientation, and wherein an entirety of the first roller, an entirety of the second roller, an entirety of the reading surface of the second reading sensor, and an entirety of a guiding surface of the document guide are included in a range between a position where the first roller contacts the original document and the platen glass.

2. The reading apparatus according to claim 1, further comprising:
a document supporting member located at a position to face the reading surface of the second reading sensor across the conveyer path, the document supporting member being urged toward the reading surface.

3. The reading apparatus according to claim 1, further comprising:
a supporting base including the platen glass on an upper side thereof; and
a document cover movable with respect to the supporting base between an open position and a closed position, the document cover located at the closed position covering the platen glass,
wherein the document tray, the ejection tray, the conveyer path, the conveyer, and the second reading sensor are located in the document cover, and
wherein the first reading sensor is located in the supporting base, the first reading sensor being configured to move in a range below the platen glass and read an image of the original document placed on the platen glass while moving.

4. The reading apparatus according to claim 3,
wherein the document cover has a resilient plate, the resilient plate being configured to contact the platen glass in a state where the document cover is at the closed position, and
wherein the resilient plate is located at a lower position with respect to the second reading sensor in the state where the document cover is at the closed position.

5. The reading apparatus according to claim 1,
wherein the plurality of rollers includes:
a third roller located downstream in the conveying orientation from the first reading sensor, the third roller being located in the curved section, and
wherein a range in which the first roller occupies in a vertical direction, a range in which the second roller occupies in the vertical direction, a range in which the third roller occupies in the vertical direction, and a range in which the second reading sensor occupies in the vertical direction at least partly overlap one another.

6. The reading apparatus according to claim 5,
wherein the range in which the second roller occupies in the vertical direction includes an entirety of the range in which the second reading sensor occupies in the vertical direction.

7. The reading apparatus according to claim 1,
wherein the first roller is configured to feed the original document being a lowermost one of a plurality of original documents stacked in the document tray to the conveyer path.

8. The reading apparatus according to claim 5,
wherein the third roller is configured to nip the original document being inverted in the curved section, and
wherein a part of the document tray overlaps the range in which the third roller occupies in the vertical direction.

* * * * *